United States Patent Office 3,041,291
Patented June 26, 1962

3,041,291
POLYMERIZATION OF EPOXIDES
Frederick E. Bailey, Jr., Charleston, and Fred N. Hill, South Charleston, W. Va., assignors to Union Carbide Corporation, a corporation of New York
No Drawing. Filed Sept. 23, 1959, Ser. No. 841,672
7 Claims. (Cl. 260—2)

This invention relates to a process for polymerizing epoxide compounds and to the products resulting therefrom.

This application is a continuation-in-part of application Serial 773,156, entitled "Polymerization of Epoxides," by F. E. Bailey, Jr. and F. N. Hill, filed November 12, 1958, said application is, in turn, a continuation-in-part of application Serial No. 687,620, entitled "Ethylene Oxide Copolymers," by F. E. Bailey, Jr. and F. N. Hill, filed October 2, 1957, said latter application is, in turn, a continuation-in-part of application Serial No. 587,935, entitled "Ethylene Oxide Copolymers," by F. E. Bailey, Jr. and F. N. Hill, filed May 29, 1956. All of the above-said applications, now abandoned, are similarly assigned to the same assignee as the instant application.

In a broad aspect the instant invention is directed to the process for copolymerizing an admixture of 1,2-alkylene oxide and 3,4-epoxycyclohexane carbonitrile in contact with a catalytically significant quantity of a divalent metal carbonate catalyst described hereinafter to produce novel solid copolymers. Polymerization is essentially effected through the epoxy group of the monomeric reagents, and as a consequence, the resulting novel solid polymer product is characterized, along the polymer chain, by pendant cyano groups. This polymer then can be subjected to hydrolysis, in a caustic medium, followed by neutralization and recovery of the polymer. There is obtained a polymer which is now characterized by pendant carboxyl (—COOH) groups along the polymer chain. The carboxyl-containing polymer, in turn, can be used as cross-linking agents for polyepoxide compounds such as 4-vinylcyclohexene dioxide, bis(2,3-epoxycyclopentyl)ether, 3,4-epoxycyclohexylmethyl 3,4-epoxycyclohexanecarboxylate, and the like to produce tough, cross-linked insolubilized products.

It is deemed appropriate at this time to define the term "reduced viscosity" since this term will be frequently employed throughout the specification. By the term "reduced viscosity," as used herein including the appended claims, is meant a value, obtained by dividing the specific viscosity by the concentration of the polymer in the solution, the concentration being measured in grams of polymer per 100 milliliters of solvent at a given temperature. The reduced viscosity value is regarded as a measure of molecular weight. The specific viscosity is obtained by dividing the difference between the viscosity of the solution and the viscosity of the solvent by the viscosity of the solvent. Unless otherwise indicated the reduced viscosity value is determined at a concentration of 0.2 gram of polymer per 100 milliliters of solvent, i.e., benzene or acetonitrile, at 30° C.

By the term "1,2-alkylene oxide," as used herein including the appended claims, is meant an organic compound which contains solely carbon, hydrogen, and oxirane oxygen, said oxirane oxygen being bonded to vicinal or adjacent carbon atoms to form the following epoxy group, i.e.,

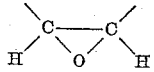

and wherein each unsatisfied epoxy carbon valence of said group is satisfied by hydrogen or a hydrocarbon radical free from ethylenic and acetylenic unsaturation, e.g., alkyl, cycloalkyl, aryl, aralkyl, or alkaryl. In addition, both unsatisfied epoxy carbon valences collectively can be satisfied by a divalent saturated aliphatic hydrocarbon radical which together with the epoxy carbon atoms form a saturated cycloalphatic hydrocarbon nucleus which contains from 4 to 10 carbon atoms inclusive. It is to be understood, also, that the term "lower 1,2-alkylene oxides" designates that each unsatisfied epoxy carbon valences of the above-depicted structural unit can be satisfied by hydrogen or a lower alkyl, e.g., methyl, ethyl, propyl, isobutyl, and the like.

Accordingly, one or more of the following objects will be achieved by the practice of this invention.

It is an object of this invention to prepare novel copolymers containing 1,2-alkylene oxide in copolymerized form with 3,4-epoxycyclohexanecarbonitrile, said 1,2-alkylene oxide and 3,4-epoxycyclohexanecarbonitrile being essentially polymerized through their respective epoxy groups. It is also an object of this invention to provide a novel process for copolymerizing an admixture of 1,2-alkylene oxide and 3,4-epoxycyclohexanecarbonitrile in contact with a catalytic quantity of a divalent metal carbonate catalyst. It is another object of this invention to provide a novel process for copolymerizing an admixture comprising greater than 50 weight percent of a lower 1,2-alkylene oxide, preferably ethylene oxide, and less than 50 weight precent of 3,4-epoxycyclohexanecarbonitrile, based on the total weight of the reactants. A further object of this invention is to prepare solid copolymers in accordance with the teachings herein set forth. A yet further object is directed to the preparation of solid copolymers, the properties and characteristics of which can be "tailor-made" to fit a wide variety of uses and fields of applications. Other objects will become apparent to those skilled in the art in the light of the instant specification.

As indicated previously, the broad aspect of this invention is directed to copolymerizing an admixture containing 1,2-alkylene oxide and 3,4-epoxycyclohexanecarboxylate in contact with a divalent metal carbonate catalyst to produce solid copolymers.

In one embodiment the monomeric 1,2-alkylene oxide employed in the polymerization process of this invention can be characterized by the following formula:

(I) 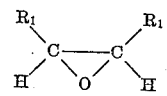

wherein each R, individually, can be hydrogen, haloaryl, or a hydrocarbon radical free from ethylenic and acetylenic unsaturation such as, for example, alkyl, aryl, cycloalkyl, aralkyl, or alkaryl radicals. In addition, both $R_1$ variables collectively can represent a divalent saturated aliphatic hydrocarbon radical which together with the epoxy carbon atoms, i.e., the carbon atoms of the epoxy group,

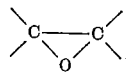

form a saturated cycloaliphatic hydrocarbon nucleus containing from 4 to 10 carbon atoms, preferably from 4 to 8 carbon atoms, for example, a saturated cycloaliphatic hydrocarbon nucleus derived from cycloalkane, alkyl-substituted cycloalkane, cyclobutane, cyclopentane, cyclohexane, cycloheptane, cyclooctane, methylcyclopentane, amylcyclohexane, and the like. Illustrative $R_1$ radicals include, among others, methyl, ethyl, propyl, butyl, isobutyl, hexyl, isohexyl, 3-propylheptyl, dodecyl, octadecyl, phenyl, halophenyl, chlorophenyl, bromophenyl, benzyl, tolyl, ethylphenyl, butylphenyl, phenethyl, phenylpropyl, cyclopentyl, cyclohexyl, 2-methylcyclohexyl, cycloheptyl, and the like. In a preferred aspect the 1,2- alkylene oxide is a lower 1,2-alkylene oxide as previously defined.

Representative 1,2-alkylene oxide monomers which can be employed include, for example, ethylene oxide, propylene oxide, 1,2-butylene oxide, 2,3-butylene oxide, the epoxypentanes, the epoxyhexanes, 2,3-epoxyheptane, nonene oxide, 5-butyl-3,4-epoxyoctane, 1,2-epoxydodecane, 1,2-epoxyhexadicane, 1,2-epoxyoctadecane, 5-benzyl-2,3-epoxyheptane, 4-cyclohexyl-2,3-epoxypentane, chlorostyrene oxide, styrene, oxide, ortho-meta-, and para-ethyl-styrene oxide, glycidyl benzene, the oxabicycloalkanes, e.g., 7-oxabicyclo[4.1.0]heptane, 6-oxabicyclo[3.1.0]hexane, 4-propyl-7-oxabicyclo[4.1.0]heptane, 3-amyl-6-oxabicyclo-[3.1.0]hexane and other alkyl-substituted oxabicycloalkanes; and the like.

The metal carbonates contemplated as catalysts in the process of the instant invention are the carbonates of divalent metals which have an atomic number greater than 11 and which are found below potassium and above tin in the Electromotive Force Series of Elements.[1] These divalent metals include, magnesium, calcium, strontium, barium, zinc, cadmium, iron, cobalt, nickel, chromium, and manganese. Particularly preferred metal carbonates, from the standpoint of increased catalytic activity and/or ease of preparation in pure form, are the group IIA metal carbonates, i.e., the calcium, strontium, or barium carbonates; group IIB metal carbonates, i.e., the zinc or cadmium carbonates; manganous carbonate; and magnesium carbonate.

In addition to the above-enumerated divalent metal carbonates, it is also observed that the trivalent metal carbonates of the lanthanide series, i.e., rare earth metals, can be employed as catalysts in the instant invention.

It has been observed that the divalent metal carbonates should contain an amount of sorbed water, i.e., adsorbed or absorbed water, which is sufficient to significantly activate or to impart significant catalytic activity to said metal carbonates. The phenomenon regarding sorbed water contained by the metal carbonates is not entirely understood at this time nor is it the desire of the inventors to be bounded by any theories regarding adsorption or absorption phenomena. It is suffice to say that the sorbed water contained by the metal carbonate is firmly tied thereto such that air-drying the metal carbonate for several days at room temperature or slightly above room temperature does not result in any essential weight loss of the sorbed water content in the metal carbonate. The sorbed water bound to the metal carbonates stand in contradistinction to a physical mixture of water and metal carbonate, e.g., an aqueous slurry of metal carbonate, in which latter case the water can be considered to be extraneous water or non-sorbed water. Thus, air-drying a physical mixture of water and metal carbonate results in the removal of the extraneous water or non-sorbed water content from said mixture.

The optimum amount of sorbed water to be contained by the metal carbonates is a natural limit and is governed, to a great extent, by various factors such as the particular metal carbonate contemplated, the method by which the metal carbonate was prepared, the surface area and sorptive characteristics of the metal carbonate, the operative conditions of the polymerization reaction, and other considerations. In general, the greater the surface area of the metal carbonate, the greater the amount of water which can be adsorbed and/or absorbed. As is readily understood, the more hydrophilic metal carbonates, e.g., zinc carbonate, tend to hold greater amounts of sorbed water than those metal carbonates in which the hydrophilic characteristics are slight, e.g., strontium carbonate.

Since the instant invention contemplates the use of several divalent metal carbonates as novel catalysts in the polymerization reaction, and further, since various factors or considerations will influence the optimum weight range of the sorbed water content in the metal carbonates, no simple rule of thumb can be expounded regarding an overall weight range of sorbed water content which should be contained by the metal carbonate catalysts. However, by following the illustrative teachings set forth in this specification one skilled in the art can readily determine by routine experimentation the amount of sorbed water which is necessary to impart optimum catalytic activity to the metal carbonate.

It has been observed that divalent metal carbonates which have been prepared in aqueous media and subsequently dried (by air-drying under reduced pressure at slightly elevated temperatures, until they tend to be essentially free flowing powders or until they can be so rendered such as by grinding, but not substantially beyond that point) will result in a catalytically activated metal carbonate. In other words, there is obtained a metal carbonate which contains as amount of sorbed water which is sufficient to significantly activate an otherwise essentially inactive metal carbonate. Moreover, a metal carbonate which has been rendered catalytically inactive such as by overdrying caused by heating said carbonate at high temperatures for an extended period of time, i.e., drying the carbonate past the point which deprives it of the prerequisite amount of sorbed water that is necessary to impart catalytic activity to said carbonate, can be once again rendered catalytically active by mixing or slurrying the metal carbonate in water and subsequently drying same to the point where it essentially reaches the free-flowing powdery stage.

Furthermore, when it has been observed that the divalent metal carbonates are significantly catalytically activated by virtue of the contained sorbed water the polymerization reaction is capable of being initiated within a reasonable time and at a reasonable rate, i.e., the polymerization reaction will commence within 16 hours at a rate of at least approximately 3 to 5 percent conversion per hour. The time lag noted prior to the initiation of the polymerization reaction is generally known as the induction period. In general, the polymerization reaction is initiated within a reasonable time and at a reasonable rate when the minimum quantity of sorbed water is about 0.01–0.02 weight percent, based on the weight of the divalent metal carbonate catalyst. It is preferred, in general, that the minimum quantity of sorbed water be above about 0.1 weight percent, based on the weight of the divalent metal carbonate catalyst. The upper limit regarding the amount of sorbed water which the catalyst can contain is a natural limit depending, to a great extent, on various factors such as those previously discussed.

The sorbed water content of the metal carbonate can be readily determined by various means which are well-known to the art. For instance, a weighed quantity of powdery metal carbonate, e.g., strontium carbonate, can be heated to a temperature of about 350° to 400° C. until an essentially constant weight metal carbonate is obtained. The weight difference in the original sample and the heat-treated sample (to constant weight) is the loss of essentially sorbed water in the original sample. The weight percent of sorbed water in the original metal carbonate sample thus is readily calculable. However, should the metal carbonate decompose or should the danger of decomposition exist under the conditions noted in the above-described determination of sorbed water content, an alternative method can be employed such as is immediately illustrated. For example, zinc carbonate can undergo at least partial decomposition at 350° to 400° C. to zinc oxide and carbon dioxide. Thus, a weighed quantity of powdery zinc carbonate can be inserted into a quartz tube which is then placed into an ignition furnace maintained at approximately 425° C. A continuous stream of high purity nitrogen is subsequently passed over the zinc carbonate and through a weighed tube containing, for example, magnesium perchlorate. The magnesium

---

[1] Handbook of Chemistry and Physics, 38th Edition, page 1660; published by Chemical Rubber Publishing Co., Cleveland, Ohio.

perchlorate is an agent which readily absorbs water but not carbon dioxide. This operation is continued until the zinc carbonate is essentially decomposed to zinc oxide (and this point will be reached when the heated sample has attained a constant weight). The increased weight of the tube containing magnesium perchlorate is attributable to the sorbed water given off during heat treatment of the carbonate sample. Again, the weight percent of sorbed water contained by the zinc carbonate sample thus is readily determined.

To illustrate the catalytic activity imparted to the metal carbonate by virtue of the contained sorbed water, one preparation of strontium carbonate (prepared by bubbling carbon dioxide into a solution of strontium hydroxide octahydrate in distilled water, and subsequently recovering the resulting strontium carbonate precipitate) which was dried at 50° C. for 16 to 18 hours contained approximately 3 weight percent of sorbed water. This catalyst was found to be satisfactorily active as a polymerization catalyst at a concentration of 3 weight percent (based on the weight of reagent). A sample of this strontium carbonate dried at higher temperatures wherein the amount of sorbed water was decreased to approximately 0.1 to 0.2 weight percent exhibited virtually unchanged catalytic activity. However, when dried for 16 to 18 hours at about 325° C. the sorbed water content contained in the strontium carbonate was reduced to about 0.01 to 0.02 weight percent. At this point, the catalytic activity of the strontium carbonate containing about 0.01 to 0.02 weight percent was lessened as compared to the strontium carbonate containing about 0.1 to 0.2 weight percent sorbed water. Further drying at temperatures above 350° C. for an additional 16 to 18 hours rendered the strontium carbonate substantially inactive as the polymerization catalyst.

By way of illustration, zinc carbonate (prepared in a manner similar to that set out in Example 4) containing approximately 20 weight percent sorbed $H_2O$ was an active polymerization catalyst at a concentration of 3 weight percent with essentially no induction period being observed. Increasing the sorbed water content on the zinc carbonate up to 48 weight percent correspondingly increased the induction period of the polymerization reaction. For example, an induction period of several minutes was observed with zinc carbonate containing 28 weight percent sorbed water whereas the induction period increased to 24 hours, and longer, with the use of zinc carbonate containing 48 weight percent sorbed water.

As previously indicated, the water associated with the catalytic activity of the metal carbonates is sorbed water. Non-sorbed water or extraneous water does not directly effect the catalytic activity of the metal carbonate catalyst; however, non-sorbed water or extraneous water present with the catalyst or contained in the monomeric reagents can inordinately prolong the induction period or the initiation of the polymerization reaction. Consequently, it is highly desirable to minimize the quantity of non-sorbed water present in the charge comprising catalyst and monomeric reagents. Factors which influence the amount of non-sorbed water to be tolerated in a particular system in order to obtain optimum operative conditions are, for example, the particular metal carbonate employed, the particle size of the metal carbonate, the 1,2-alkylene oxide reagent employed, the method by which the metal carbonate was prepared, and other considerations. Generally, satisfactory polymerization rates are obtained when the quantity of non-sorbed water or extraneous water present in the charge comprising catalyst and monomeric reagents does not exceed about 1 weight percent, preferably about 0.5 weight percent, based on the weight of monomeric reagents; however, higher quantities of non-sorbed water can be present but, as stated previously, the induction period may be inordinately increased. Consequently, it is highly preferred that the metal carbonate catalyzed polymerization reaction be conducted under substantially anhydrous conditions.

It has also been observed that certain adsorbed or occluded ions such as oxygen-containing and "thio-oxygen" containing anions tend to decrease the catalytic activity of the metal carbonate catalyst. A notable exception is the sulfate ion. On the other hand, adsorbed or occluded chloride, cyanide or acetate ions do not appear to deleteriously affect the catalytic activity of the metal carbonates. It is further desirable that the divalent metal carbonates be prepared in the absence of nitrate ion, chlorate ion, thiosulfate ion, or tetraborate ion since the substantial presence of these ions can result in considerably long induction periods. However, thoroughly water-washing the divalent metal carbonates prepared in the presence of the above-illustrated interfering ions will serve to essentially remove these ions.

The metal carbonates suitable as catalysts in the process of the instant invention can be prepared by reacting the corresponding divalent metal salt, e.g., the divalent metal chloride, cyanide, and acetate, with sodium carbonate, or other soluble carbonates, and subsequently recovering the resulting divalent metal carbonate precipitate. When the hydroxide of the divalent metal is soluble, the divalent metal carbonate can be obtained as a precipitate by bubbling carbon dioxide into an aqueous solution containing the soluble divalent metal hydroxide. The divalent metal carbonates contemplated as catalysts can also be prepared from salts of the appropriate divalent metal in which the anionic component thereof is one of the interfering ions enumerated previously. However, the preparation should be carried out so as to minimize the presence of adsorption or occlusion of these interfering ions in the desired carbonate product, e.g., slow precipitation of the carbonate product from relatively dilute aqueous solution, followed by thorough washing or digesting said precipitated carbonate with water or water-containing carbon dioxide.

The divalent metal carbonate is employed in catalytically significant quantities. In general, a catalyst concentration in the range of from about 0.01 to about 5 weight percent, based on the weight of monomeric feed, is suitable. Advantageous results are obtained by employing the group IIA metal carbonates at a concentration in the range of from about 0.3 to 3 weight percent, based on the monomeric feed. Manganese carbonate can be employed at a concentration of from about 0.1 to 1.0 weight percent, based on the weight of the monomeric feed, with effective results. For optimum results, the particular divalent metal carbonate employed, its preparation, its surface, the nature of the 1,2-alkylene oxide reagent, the operative temperature at which the polymerization reaction is conducted, the other factors will largely determine the desired catalyst concentration.

The proportion of the reagents, i.e., 1,2-alkylene oxide and 3,4-epoxycyclohexanecarbonitrile, can vary over a wide range. Preferably the concentration of either monomeric reagent is in the range of from about 5 to about 95 weight percent, based on the total weight of the reagents. In a preferred aspect the novel copolymer products of this invention comprise from about 5 to 95 weight percent 1,2-alkylene oxide and from about 95 to 5 weight percent 3,4-epoxycyclohexanecarbonitrile, based on the weight of the copolymer, chemically combined therein. In a further preferred aspect the novel copolymer products comprise at least about 50 to about 95 weight percent 1,2-alkylene oxide, preferably ethylene oxide, and from about 50 to about 5 weight percent 3,4-epoxycyclohexanecarbonitrile, chemically combined therein.

The polymerization reaction can be conducted at a temperature in the range of from about 25° to about 150° C., preferably from about 70° to about 150° C., and more preferably, from about 90° C. to about 150° C. As a practical matter, the choice of the particular temperature at which to effect the polymerization reaction depends, to an extent, on the nature of the 1,2-alkylene oxide reagent and particular catalyst employed, the concentration of the catalyst, and the like.

In general, the reaction time will vary depending on the operative temperature, the nature of the 1,2-alkylene oxide reagent employed, the particular catalyst and the concentration employed, the use of an inert organic diluent, and other factors. The reaction time can be as short as a few hours in duration or shorter or it can be as long as several days. A feasible and suitable reaction period is from about 5 hours, and lower, to about 100 hours, and longer, preferably from about 10 hours to 60 hours.

The polymerization reaction takes place in the liquid phase and a pressure above atmospheric may be employed to maintain the liquid phase. However, in the usual case, external pressure is unnecessary, and it is only necessary to employ a reaction vessel capable of withstanding the autogenous pressure of the reaction mixture. It is highly desirable to conduct the polymerization reaction under substantially anhydrous conditions.

The novel copolymers of this invention can be prepared via bulk polymerization, suspension polymerization, or the solution polymerization routes. The polymerization reaction can be carried out in the presence of an inert organic vehicle such as, for example, aromatic compounds, e.g., benzene, toluene, xylene, ethylbenzene, chlorobenzene, and the like; various oxygenated organic compounds such as dimethyl and diethyl ethers of ethylene glycol, of propylene glycol, of diethylene glycol; anisole; and the like; normally liquid saturated hydrocarbons including the open chain, cyclic, and alkyl substituted cyclic saturated hydrocarbons such as pentane, hexane, heptane, various normally-liquid petroleum hydrocarbon fractions, cyclohexane, the alkylcyclohexanes, decahydronaphthalene, and the like.

An induction period may be observed in that the polymerization is not initiated immediately. The induction period can be as short as or shorter than minutes in length with the more active catalysts or it can be as long as 24 hours or more. This induction periods depends not only on the individual metal carbonate, its preparation, its surface area, the concentration of the metal carbonate, the nature of the monomeric feed, the reaction temperature, the purity of the monomeric feed, and other factors. Certain impurities which may be present in the monomeric feed have an inhibiting effect on the polymerization reaction, these impurities being carbon dioxide, oxygen, aldehydes, and water. In particular, the inhibiting effect of water and oxygen appears in prolongation of the induction period prior to the initiation of the polymerization reaction. Small amounts of these impurities may be tolerated; however, it is highly advantageous to employ high purity reagent, catalyst, etc., thus avoiding inordinately prolonged induction periods.

Unreacted monomeric reagent oftentimes can be recovered from the reaction product by conventional techniques such as by heating said reaction product under reduced pressure. The copolymer product also can be recovered from the reaction product by washing said reaction product with an inert, normally-liquid organic vehicle in which the polymer product is insoluble, followed by recovering the polymer product such as by filtration, and subsequently drying same under reduced pressures at slightly elevated temperatures. Another route involves dissolution in a first inert organic vehicle followed by addition of a second inert organic vehicle which is miscible with the first vehicle but which is a non-solvent for the copolymer product, thus precipitating the copolymer product. Recovery of the precipitated copolymer can be effected by filtration, decantation, etc., followed by drying same as indicated previously.

The copolymers of this invention can be water-soluble or water-insoluble solid compositions depending upon the ratio of the chemically combined monomeric content therein. In general, those copolymers containing a minor proportion, i.e., less than 50 weight percent, of ethylene oxide copolymerized therein are hard, tough, water-insoluble compositions. However, it is generally observed that the preparation of copolymers containing greater than 50 weight percent of ethylene oxide chemically combined in said copolymers, tend to be water-soluble, and this water-soluble characteristic increases as the ethylene oxide content of the resulting copolymer increases. Thus, the instant invention is admirably suited for the preparation of "tailor-made" solid copolymers which have characteristics and properties built into said copolymers; consequently, solid or resinous copolymers covering a spectrum of mechanical porperties can be obtained with characteristics that are highly desirable in various fields of applications and uses.

The copolymers of this invention have a variety of uses. The resinous copolymers are useful for the production of various shaped articles, e.g., buttons, brush handles, lamp bases, etc. The water-soluble and water-insoluble solid copolymers are also useful in the preparation of films by conventional techniques such as by milling on a two-roll mill, calendering, solvent casting, and the like. Those copolymers containing lower 1,2-alkylene oxide, and in particular greater than 50 weight percent ethylene oxide, are especially preferred copolymeric classes.

In various illustrative examples below the procedure employed, to prepare the polymer was as follows (unless noted otherwise). A 9-inch Pyrex tube 22 mm. in diameter was sealed at one end; the other end of the tube was fitted with a 3-inch piece of 8 mm. Pyrex tubing. The tube was cleaned, dried and flushed with dry nitrogen; a weighed quantity of catalyst was then introduced into the tube. The monomeric mixture was charged to the tube in a "dry box" containing a nitrogen atmosphere. The tube was then closed with a rubber cap, followed by cooling in Dry Ice-acetone bath. The tube was sealed under the vacuum thus obtained. The sealed tube was subsequently inserted into an aluminum block, said aluminum block being agitated by rocking at the desired operating temperature for a given period of time. After this, the tube was cracked open and the reaction product was placed in a vacuum, e.g., about 10 to 30 mm. of Hg at 30°–40° C., until dried.

*Example 1*

Strontium carbonate was precipitated by bubbling carbon dioxide into an aqueous solution of strontium hydroxide octahydrate. The precipitated strontium carbonate was recovered by filtration and subsequently, various samples thereof were heated at different temperatures. One sample was heated at 55° C. until the strontium carbonate contained about 1.5 weight percent sorbed water; a second sample was heated at 120° C. until the strontium carbonate contained about 1.0 weight percent sorbed water; and a third sample was heated at 200° C. until the strontium carbonate contained about 0.5 weight percent sorbed water. All three of these samples were observed to be active polymerization catalysts.

On continued heating the said three strontium carbonate samples above 250° C., the catalytic activity thereof was progressively reduced. On heating the samples at a temperature of 350° to 400° C. for 24 to 48 hours, i.e., to a point wherein the sorbed water was essentially nil, the strontium carbonate samples became essentially inactive as catalysts.

*Example 2*

Cadmium sulfate (208 grams) was dissolved in one liter of water, and 100 grams of potassium bicarbonate was dissolved in a second liter of water. Both solutions were then cooled to 1° C. Subsequently, the bicarbonate solution was added to the cadmium sulfate solution, with vigorous stirring, over a period of about 30 to 35 minutes. The resulting precipitate was recovered by filtration and washed three times with cold, carbon dioxide-saturated distilled water. The cadmium carbonate precipilate was then dried for 24 hours at 180° C. The cadmium carbonate sample was catalytically active.

*Example 3*

Ferrous chloride tetrahydrate (20 grams) was dissolved in one liter of distilled water. Sodium carbonate (11 grams) was dissolved in a second liter of water. The sodium carbonate solution then was slowly poured, under vigorous stirring, into the ferrous chloride solution. The resulting ferrous carbonate precipitate was filtered, washed four times by slurrying in distilled water, and then dried in an oven at 128° C. for 20 hours. The ferrous carbonate was catalytically active.

*Example 4*

Zinc oxide (54 grams) was added to one liter of 5 percent sulfuric acid. The solution was brought to a boil and then 20 milliliters of concentrated sulfuric acid were added thereto. To the resulting clear solution (after cooling to 3° C.) there was added one liter of a cold solution of potassium bicarbonate saturated with carbon dioxide. The precipitated zinc carbonate was recovered by filtration, washed several times with cold water, and subsequently dried for 24 hours in a desiccator maintained at 120° C. The zinc carbonate was catalytically active.

*Example 5*

A saturated solution of calcium hydroxide was prepared at room temperature, i.e., approximately 25° C. Calcium carbonate was precipitated by bubbling carbon dioxide through this solution. The resulting calcium carbonate solution was recovered by filtration, and dried at 120° C. for 2 hours. The calcium carbonate was catalytically active.

*Example 6*

A solution of 10.6 grams of sodium carbonate in 200 milliliters of distilled water was slowly poured into a stirred solution containing 24.4 grams of barium chloride dihydrate in one liter of distilled water. The resulting barium carbonate precipitate was recovered by filtration and dried at 120° C. for a period of 93 hours. The barium carbonate was catalytically active.

*Example 7*

Ethylene oxide (27 grams), 3,4-epoxycyclohexanecarbonitrile (3 grams), and strontium carbonate (0.9 gram, containing approximately 0.5 weight percent sorbed water) were sealed in a small glass tube and gently agitated in a water bath at 90° C. for 40 hours. A yield of 100 percent copolymer was obtained. This copolymer was a hard, tough, water-soluble solid which had a reduced viscosity value of 1.0 in acetonitrile.

In an analogous manner as above, when an equal weight of propylene oxide is substituted for ethylene oxide there is obtained a tough, water-insoluble resin.

*Example 8*

Ethylene oxide (27 grams), 3,4-epoxycyclohexanecarbonitrile (3 grams), and strontium carbonate (0.9 gram, containing approximately 0.5 weight percent sorbed water) were sealed in a small glass tube and gently agitated in a water bath at 90° C. for 42 hours. The yield was 25.5 grams of a hard, tough, water-soluble resinous copolymer which had a reduced viscosity value of 3.3 in acetonitrile.

In an analogous manner as above, when equal parts by weight of propylene oxide and 3,4-epoxycyclohexanecarbonitrile are copolymerized in the presence of 3.0 weight percent, based on the total weight of monomeric feed, of manganous carbonate (sorbed water content approximately 1.0 weight percent), there is obtained a tough, water-insoluble copolymer product.

*Example 9*

Ethylene oxide (24 grams), 3,4-epoxycyclohexanecarbonitrile (6 grams), and strontium carbonate (0.9 gram, containing approximately 0.5 weight percent sorbed water) were sealed in a small glass tube and gently agitated in a water bath at 90° C. for 108 hours. There was obtained 27.5 grams of a hard, tough, water-soluble resin which had a reduced viscosity value of 2.0 in acetonitrile.

When an equal weight of 1,2-epoxybutane and 3,4-epoxycyclohexanecarbonitrile are substituted in the above process, there is obtained a water-insoluble solid copolymer.

*Example 10*

Ethylene oxide (21 grams), 3,4-epoxycyclohexanecarbonitrile (9 grams), and strontium carbonate (0.9 gram, containing approximately 0.5 weight percent sorbed water) were sealed in a small glass tube and gently agitated in a water bath at 90° C. for 42 hours. There was obtained 28 grams of a hard, tough, water-soluble resin which had a reduced viscosity value of 0.7 in acetonitrile.

In an analogous manner as above, when an equal weight of styrene oxide is substituted for ethylene oxide and the polymerization reaction is conducted in the presence of 2.0 weight percent calcium carbonate (sorbed water content approximately 1.5 weight percent), there is obtained a water-insoluble solid copolymer.

*Example 11*

Ethylene oxide (18 grams), 3,4-epoxycyclohexanecarbonitrile (12 grams), and strontium carbonate (0.9 gram, containing approximately 1.5 weight percent sorbed water) were sealed in a small glass tube and gently agitated in a water bath at 90° C. for 42 hours. There was obtained 22.8 grams of a hard, tough, water-soluble resin which had a reduced viscosity value of 1.0 in acetonitrile.

In an analogous manner as above, when equal parts by weight of epoxycyclopentane and 3,4-epoxycyclohexanecarbonitrile are copolymerized in the presence of 2.0 weight percent, based on the total weight of monomeric feed, of magnesium carbonate (sorbed water content approximately 1.5 weight percent), there is obtained a hard, water-insoluble copolymer product.

It is obvious that reasonable variations and modifications of this invention can be made without departing from the spirit and scope thereof.

What is claimed is:

1. A solid copolymer of 1,2-alkylene oxide having the formula:

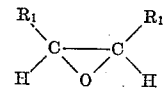

wherein each $R_1$, individually, is selected from the group consisting of hydrogen, a hydrocarbon radical free from ethylenic and acetylenic unsaturation, and radicals which together with the epoxy carbon atoms shown in the above formula represent a saturated cycloaliphatic hydrocarbon nucleus containing from 4 to 10 carbon atoms with 3,4-epoxycyclohexanecarbonitrile, said copolymer being characterized by pendant cyano groups.

2. The composition of claim 1 wherein said 1,2-alkylene oxide is ethylene oxide.

3. The composition of claim 2 wherein said copolymer contains from about 50 to 95 weight percent of ethylene oxide in copolymerized form with from about 50 to about 5 weight percent of 3,4-epoxycyclohexanecarbonitrile.

4. A solid copolymer of a lower 1,2-alkylene oxide with 3,4-epoxycyclohexanecarbonitrile, said copolymer being characterized by pendant cyano groups.

5. A solid copolymer of propylene oxide with 3,4-epoxycyclohexanecarbonitrile, said copolymer being characterized by pendant cyano groups.

6. A solid copolymer of butylene oxide with 3,4-epoxycyclohexanecarbonitrile, said copolymer being characterized by pendant cyano groups.

7. A solid copolymer of 3,4-epoxycyclohexanecarbonitrile with a vicinalepoxycycloalkane, the cycloalkane nucleus of which contains from 4 to 10 carbon atoms, said copolymer being characterized by pendant cyano groups.

References Cited in the file of this patent

UNITED STATES PATENTS

| | | |
|---|---|---|
| 2,476,922 | Shokal et al. | July 19, 1949 |
| 2,785,185 | Phillips et al. | Mar. 12, 1957 |

OTHER REFERENCES

Mousseron et al.: Bull. Soc. Chim., France, 1948, pp. 79–84.